United States Patent
Zhou et al.

(10) Patent No.: US 11,458,547 B2
(45) Date of Patent: Oct. 4, 2022

(54) SELF-LOCKING DRILL CHUCK

(71) Applicant: ZHEJIANG SANOU MACHINERY CO. LTD., Zhejiang (CN)

(72) Inventors: Wenhua Zhou, Zhejiang (CN); Xuebiao Tong, Zhejiang (CN); Yungui Wu, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 21 days.

(21) Appl. No.: 16/941,964

(22) Filed: Jul. 29, 2020

(65) Prior Publication Data
US 2021/0039174 A1 Feb. 11, 2021

(30) Foreign Application Priority Data
Aug. 7, 2019 (CN) .......................... 201910723807.0

(51) Int. Cl.
*B23B 31/12* (2006.01)
(52) U.S. Cl.
CPC ........ *B23B 31/123* (2013.01); *B23B 31/1238* (2013.01); *B23B 2231/38* (2013.01)
(58) Field of Classification Search
CPC ............ B23B 31/1207; B23B 31/1238; B23B 31/123; B23B 2231/38; Y10T 279/17615; Y10T 279/17632; Y10T 279/32; Y10S 279/902
See application file for complete search history.

(56) References Cited

U.S. PATENT DOCUMENTS

| 6,053,507 A * | 4/2000 | Yang ................... B23B 31/1238 279/62 |
| 6,889,986 B2 * | 5/2005 | Rohm ................. B23B 31/1238 279/62 |
| 7,451,990 B2 * | 11/2008 | Young ................... B23B 31/123 279/140 |

(Continued)

FOREIGN PATENT DOCUMENTS

| CN | 109158628 A * | 1/2019 | ........... B23B 31/123 |
| CN | 111822758 A * | 10/2020 | |

OTHER PUBLICATIONS

Machine Translation, CN 109158628A. (Year: 2019).*
Machine Translation, CN 111822758 A. (Year: 2020).*

*Primary Examiner* — Chwen-Wei Su
(74) *Attorney, Agent, or Firm* — Muncy, Geissler, Olds & Lowe, P.C.

(57) ABSTRACT

The present invention provides a self-locking drill chuck, which the front end of its nut is provided with a number of keys, and the spring piece of the self-locking mechanism is assembled on the nut by being elastically limited between the keys of the nut. The second end of the spring piece passes into the gap between the keys and the drill body through a pair of keys among the keys, and is elastically attached to the key by its elasticity. The connecting protrusion of the spring piece is arranged on the portion of the spring piece between the pair of keys, and the lock end is located in the gap between the key corresponding to the lock end and the drill body. The present invention can not only prevent the self-locking state from exiting due to the inertia effect, but also has the advantages of convenient assembly and can further improve the self-locking performance.

14 Claims, 9 Drawing Sheets

(56) References Cited

U.S. PATENT DOCUMENTS

| | | | |
|---|---|---|---|
| 9,016,699 B2* | 4/2015 | Sakamaki | B23B 31/123 279/62 |
| 11,123,807 B2* | 9/2021 | Zeng | B23B 31/123 |
| 2015/0165529 A1* | 6/2015 | Qiao | B23B 31/123 279/62 |
| 2017/0225236 A1* | 8/2017 | Zhou | B23B 31/123 |
| 2018/0236565 A1* | 8/2018 | Zhou | B23B 31/123 |
| 2021/0170499 A1* | 6/2021 | Sakamaki | B23B 31/123 |

* cited by examiner

SELF-LOCKING DRILL CHUCK

TECHNICAL FIELD

The invention relates to a drill chuck, in particular to a hand-tight drill chuck.

BACKGROUND

In the prior art, the drill chuck is provided with a drill body, jaws, a nut, a bearing, a gasket, a rotatable sleeve and a back sleeve. By rotating the nut, the chuck can move forward or backward to clamp or loosen the drill. The self-locking structure in the drill chuck is a structure to prevent the drill from being loosened due to the reaction force on the drill chuck when it is working, which is generally composed of a spring piece and teeth on the drill body or other fixed structures. For self-locking drill chucks, in order to prevent the self-locking state from exiting due to inertia, corresponding connection structures will be provided, but the setting of these structures will cause tedious installation steps of the drill chuck and a complex connection structure, which is not conducive to the cost control of the drill chuck.

SUMMARY

The technical problem to be solved by the invention is to provide a self-locking drill chuck, which can not only prevent the self-locking state from exiting due to inertia, but also has the advantages of convenient assembly and the capability of further improvement of the self-locking performance. Therefore, the invention adopts the following technical solutions:

A self-locking drill chuck comprises a rotatable sleeve, a drill body, a nut, jaws and a self-locking structure, and the self-locking structure comprises teeth and a spring piece; the teeth are on the drill body or on a component fixed on the drill body, and the spring piece and the nut rotate synchronously; the first end of the spring piece is used as the lock end cooperated with the teeth, and a connecting protrusion is provided near the second end; the rotatable sleeve has a first portion that is connected with the connecting protrusion of the spring piece in a self-locking state, and a second portion that is connected with the connecting protrusion of the spring piece in a un-self-locking state, and a cam structure for controlling the lock end of the spring piece, wherein:

The front end of the nut is provided with several keys, and the spring piece is limited between the keys of the nut by its elasticity so that it is assembled on the nut; the second end of the spring piece passes into the gap between the keys and the drill body through a pair of keys among the keys, and is attached to the key by its elasticity; the connecting protrusion is arranged on the spring piece portion between the pair of keys;

The lock end is located in the gap between the key corresponding to the lock end, and the drill body.

Furthermore, the front end of the nut is provided with a first key, a second key, a third key and a fourth key along the circumferential direction, wherein the second end of the spring piece passes into the gap between the keys and the drill body through the third key and the fourth key and is elastically attached to the fourth key by itself; the spring piece is provided with a lock end protrusion cooperated with the cam structure near the lock end, and the spring piece is arranged between the side where the third key is far away from the fourth key to the side where the second key is close to the first key, and is located in the gap between the keys and the drill body; the lock end protrusion protrudes from between the first key and the second key to the outside of the nut to cooperate with the cam structure.

Furthermore, the space between the second key and the third key forms a turning groove; the rotatable sleeve corresponds to the space between the second key and the third key is provided with a key; the portion of the spring piece corresponding to the space between the second key and the third key is bent to the inside of the turning groove and the inside of the key of the rotatable sleeve, and the remaining circumferential length of the space between the second key and the third key after removing the key of the rotatable sleeve corresponds to the rotation angle of the rotatable sleeve when the un-self-locking state and the self-locking state are switched.

Further, the spring piece is provided with a protrusion that surrounds the third key 23 on at least two sides from the outside.

Further, the nut is an integral nut, which the front end of the drill chuck is provided with a limit structure for the nut, and the drill body is not provided with an axial limit groove for the nut.

Furthermore, the front end of the nut is provided with a limit step, and the inside of the rotatable sleeve is provided with a limit structure cooperated with the limit step of the nut; after the combined component of the nut and the spring piece is mounted on the outside of the front end of the drill body, the rotatable sleeve is installed, which the installation and limit of the nut are completed.

Further, a fifth key is arranged between the second key and the third key, at the front end of the nut, and the fifth key is arranged close to the third key with the space between the fifth key and the third key satisfying the spring piece to pass through.

Furthermore, the space between the second key and the fifth key forms a turning groove, and the rotatable sleeve corresponds to the space between the second key and the fifth key is provided with a key; the remaining circumferential length of the space between the second key and the fifth key after removing the key of the rotatable sleeve corresponds to the rotation angle of the rotatable sleeve when the un-self-locking state and the self-locking state are switched.

Further, a ring of the teeth is arranged on the drill body, and the outer diameter of the ring of the teeth is not greater than the bore of the nut; in the axial direction of the drill chuck, the main body of the spring piece moves backward to the rear of the teeth and does not cover the periphery of the teeth; the spring piece is provided with an axial protrusion at the portion where the main body of the spring piece is close to the lock end, and on the basis of the main body of the spring piece, the lock end of the spring piece can reach the position that cooperates with the teeth through the axial protrusion.

Further, the rotatable sleeve comprises a main sleeve body and a metal shell, and the main sleeve body is provided with the cam structure and the structure connected with the spring piece.

Furthermore, in the axial direction, the main sleeve body of the rotatable sleeve does not extend to the axial position corresponding to the rear end of the each jaw when the jaw retreats to the limit position, and the metal shell of the rotatable sleeve is radially positioned with the rear end of the drill body through a back cover fixed at the rear of the rotatable sleeve.

Further, the rotatable sleeve comprises a main sleeve body and a metal shell, and the main sleeve body is provided with the cam structure, the structure connected with the spring piece and the keys cooperated with the turning groove.

Furthermore, the rotatable sleeve comprises a main sleeve body and a metal shell; the axial positioning of the front part of the integral nut is formed by the cooperation of the integral nut and the main sleeve body, and the nut is cooperated with one or two of the main sleeve body and the drill body to achieve radial positioning; the drill chuck is provided with a washer which is supported on a step provided in the middle of the drill body, and the nut is placed on the washer through the bearing; the radial positioning of the bearing is not through the drill body, but is cooperated with one or two of the washer, the main sleeve body and the nut.

Furthermore, the washer is provided with concession grooves for the jaws; the inner periphery of the washer between the two jaw concession grooves forms a radial positioning cooperation with the drill body; a plurality of the teeth are arranged around the inner periphery of the washer between the jaw concession grooves, and the tooth tips of the teeth on the inner periphery of the washer are embedded into the surface of the drill body; the inner periphery of the washer between the jaw concession grooves is embedded into a groove on the surface of the drill body; the drill body is provided with a positioning step at the front of the support step, and the circumference of the positioning step is radially positioned with the washer; the positioning step protrudes from the drill body portion in front of it, and the tooth tips of the teeth on the inner periphery of the washer are embedded into the surface of the drill body.

Furthermore, in the axial direction, the circular track of the teeth partially intersects with the contour of the jaw slots on the surface of the drill body.

The present invention can prevent the self-locking state from existing due to inertia when the spring and the nut form an assembly, and greatly simplify the assembly steps and the unnecessary structure provided to avoid interference; the operation process of entering the self-locking state is more flexible, and the rotation driving structure can play the role of clamping and fulcrum for the spring piece, which can further improve the performance of the drill chuck to maintain the self-locking state.

DETAILED DESCRIPTION

Figure 1:
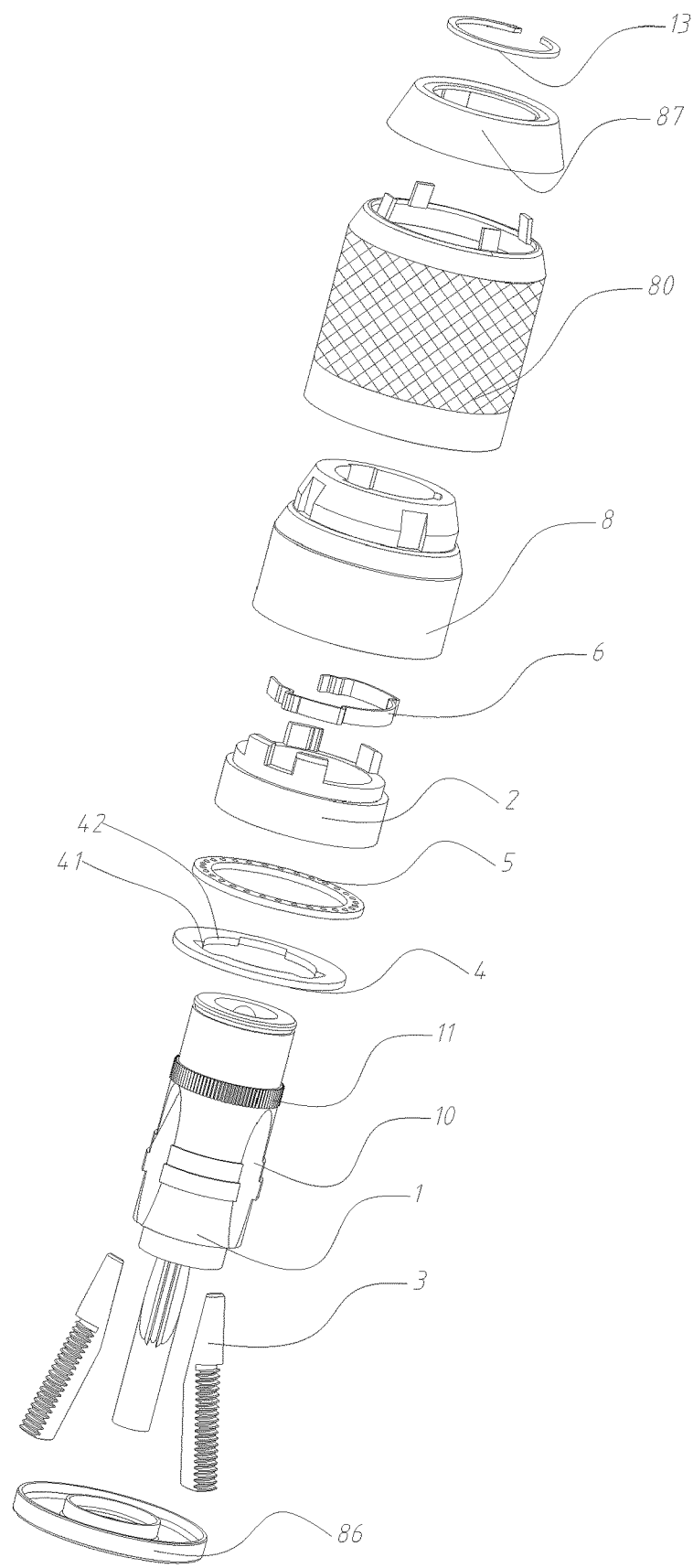
FIG. 1 is an exploded view of embodiment 1 of the present invention.

Embodiment 1, refers to FIGS. 1-7.

The self-locking drill chuck provided by the present invention comprises a rotatable sleeve 8, a drill body 1, a nut 2, jaws 3 and a self-locking structure. The self-locking structure comprises teeth 11 and a spring piece 6. The teeth 11 are directly on the drill body 1 or installed on the drill body 1 as an independent ring of teeth component. The spring piece 6 is located at the periphery of the teeth 11 and rotates synchronously with the nut 2. The length of the spring piece 6 satisfies that its bending angle around the drill body is greater than 180° at the position of the drill chuck. The first end of the spring piece 6 is a lock end 61 cooperated with the teeth 11. The rotatable sleeve 8 has a first part 83 connected with the spring piece 6 in the self-locking state and a second part 84 connected with the spring piece 6 in the un-self-locking state. The spring piece 6 is provided with a lock end protrusion 62 close to the lock end, and a connection protrusion 63 is arranged near the other end (the second end 64). The connection protrusion 63 enters into the groove of the first portion 83 in the self-locking state, and enters into the groove of the second portion 84 in the un-self-locking state, and a cam surface 85 cooperated with the lock end protrusion 62 is also arranged in the rotatable sleeve 8.

The front end of the nut 2 is provided with a first key 21, a second key 22, a third key 23 and a fourth key 24 along the circumferential direction, wherein the second end of the spring piece 6 passes into the gap between the keys and the drill body 1 through the third key 23 and the fourth key 24, and is elastically attached to the fourth key 24 by itself. The portion 66 of the spring piece 6 on the side where the third key 23 is far away from the fourth key 24 to the side where second key 22 is close to the first key 21 is in the annular track of the gap between the keys and the drill body, i.e., the inner side of the following turning groove 25 and the inner side of the key 81 of the rotatable sleeve. The lock end protrusion 62 protrudes from between the first key 21 and the second key 22 to the outside of the nut 2 to cooperate with the cam structure 85. The spring piece 6 can not only make the connection protrusion 63 connect with the rotatable sleeve in different states of the drill chuck, to prevent the self-locking state from existing due to inertia and play the role of connecting the rotatable sleeve 8 and the nut 2 in the un-self-locking state, but also can be fixed on the nut completely by its own tension during the installation, so that there is no need for other complicated installation structures and avoidance structures, which the installation operation is also very convenient, and the operation feeling of entering the self-locking state is more smooth.

The spring piece 6 is provided with a protrusion 65 that surrounds around the third key 23 from at least two sides, and the connection protrusion 63 is arranged on the portion of the protrusion 65 between the third key 23 and the fourth key 24.

The space between the second key 22 and the third key 23 forms an turning groove 25, and the space between the second key 22 and the third key 23 corresponding to the rotatable sleeve 8 is provided with a key 81; the spring piece 6 corresponding to the portion 66 of the space between the second key 22 and the third key 23 is bent to the inner side of the turning groove and the inner side of the keys of the rotatable sleeve, and the remaining circumferential length of the space between the second key 22 and the third key 23 after removing the key 81 of the rotatable sleeve corresponds to the rotation angle of the rotatable sleeve when the un-self-locking state and the self-locking state are switched. In this way, in the self-locking state, the cooperation of the key 81 and the third key 23 can further stabilize the spring piece, and further improve the working stability of the spring piece under the premise of simple structure.

In the above embodiment, the spring piece 6 is directly installed on the nut 2, and the nut may also be combined with a nut sleeve in the implementation. At this time, as an alternative, the first key 21, the second key 22, the third key 23 and the fourth key 24 can be arranged on the nut sleeve, and the spring piece is installed on the nut by installing on the nut sleeve.

In the above embodiment, the nut 2 is an integral nut, and the drill body 1 is not provided with an axial limit groove for the nut 2; the front end of the nut 2 is provided with a limit step 27, and the inner side of the rotatable sleeve 8 is provided with a limit structure 82 which is cooperated with the limit step 27 of the nut 2. After the combined components of the nut 2 and the spring piece 6 are mounted on the outside of the front end of the drill body, the rotatable sleeve 8 is installed to complete the installation and limitation of the nut 2, which is very convenient. Through the above-mentioned solution of installing the spring piece inside the front end of the nut, the integral nut can be applied to the drill chuck and its effect can be completely achieved.

Reference number 80 is the metal shell of the rotatable sleeve.

Figure 8:
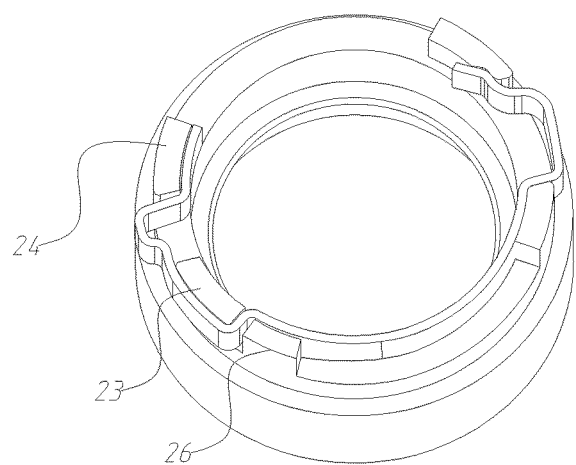
FIG. 8 is a schematic diagram of the nut in embodiment 2 of the present invention.
Figure 9:
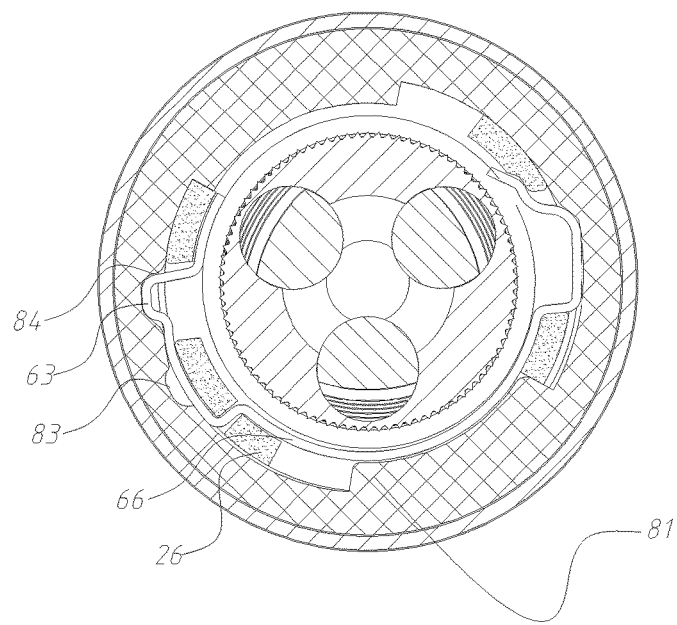
FIG. 9 is a sectional view of embodiment 2 of the present invention when it is in a un-self-locking state, showing the cooperating state of the key on the spring piece, the teeth, the rotatable sleeve and the nut.
Figure 10:
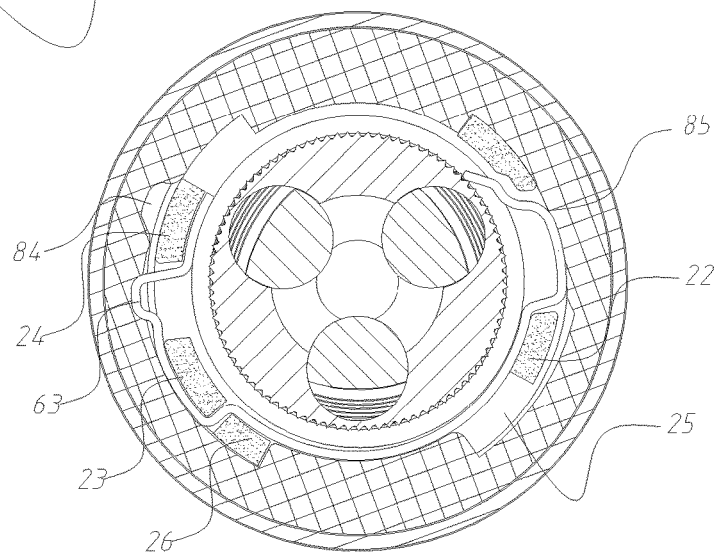
FIG. 10 is a sectional view of embodiment 2 of the present invention when it is in the self-locking state, showing the cooperating state of the key on the spring piece, the teeth, the rotatable sleeve and the nut.
Figure 11:
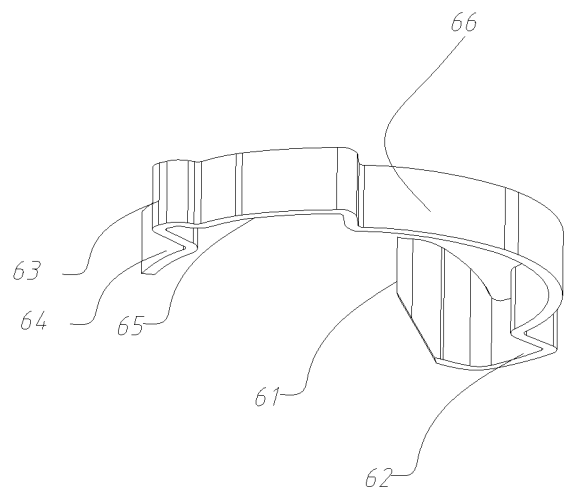
FIG. 11 is a schematic diagram of the spring piece in embodiment 3 of the present invention.
Figure 12:
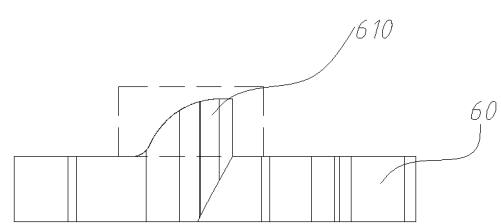
FIG. 12 is a front view of the spring piece of embodiment 3 of the present invention.
Figure 13:
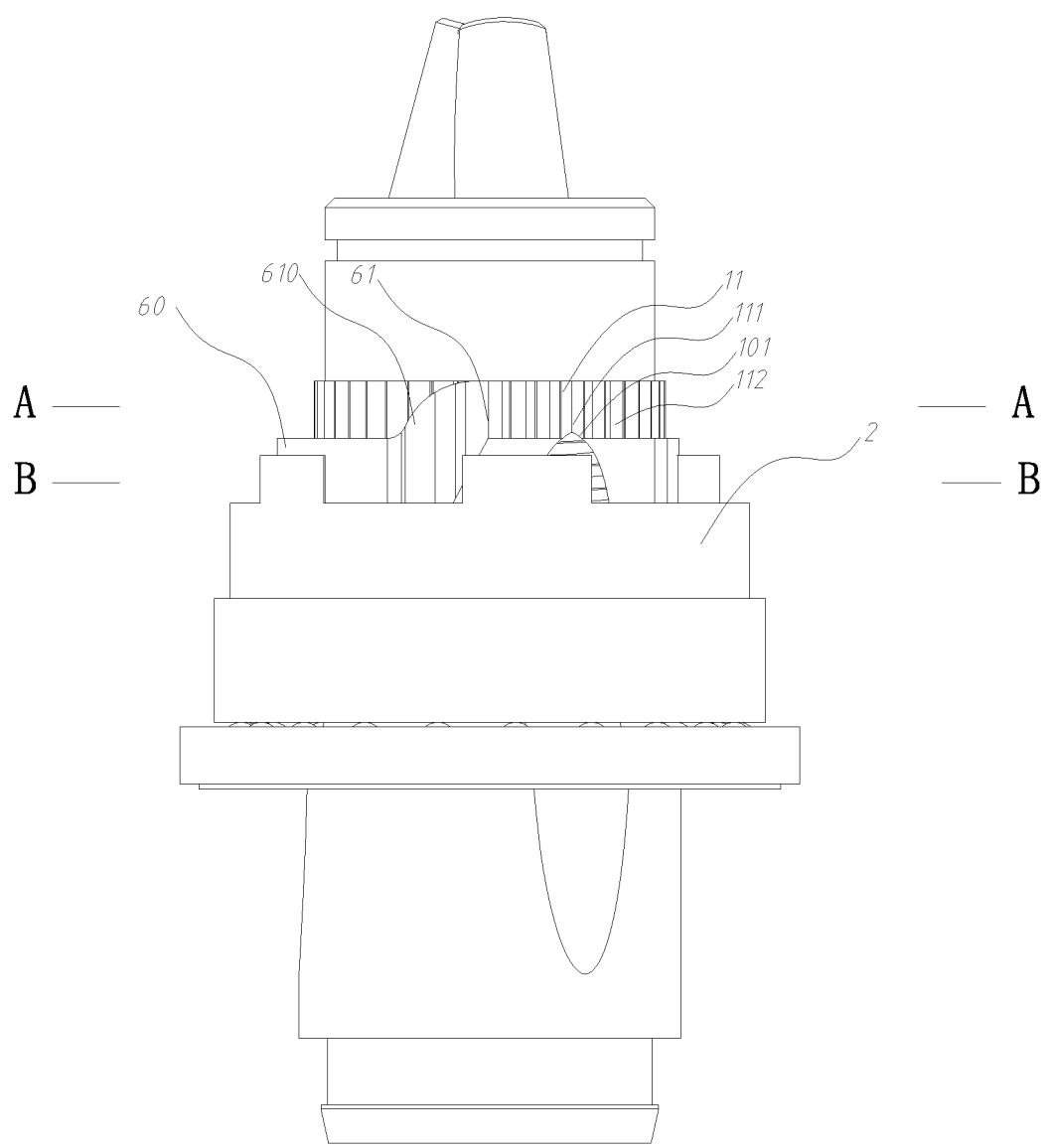
FIG. 13 is a schematic diagram of embodiment 3 of the present invention after removing the rotatable sleeve and the rear cover.
Figure 14:
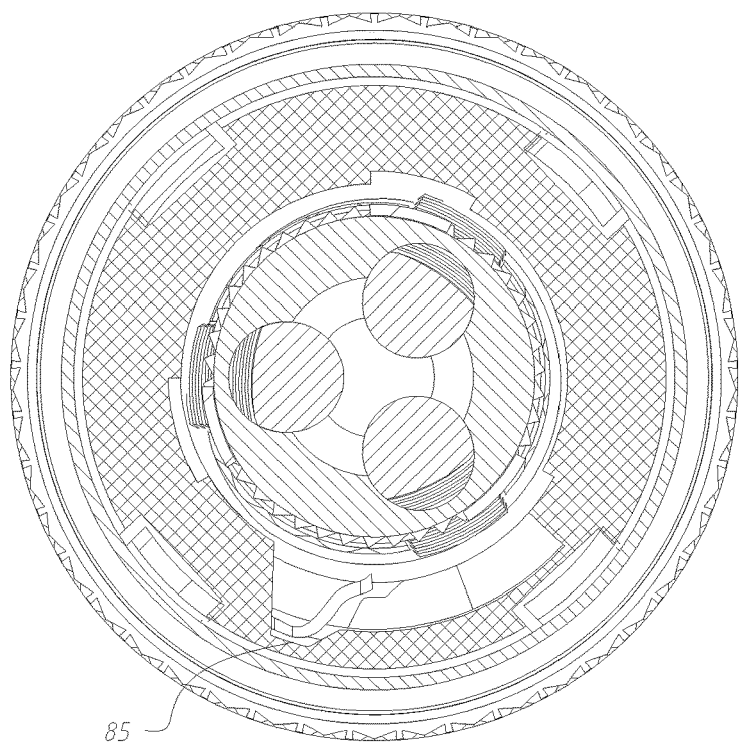
FIGS. 14 and 15 are sectional views of lines A-A and B-B in FIG. 13 in un-self-locking state.
Figure 15:
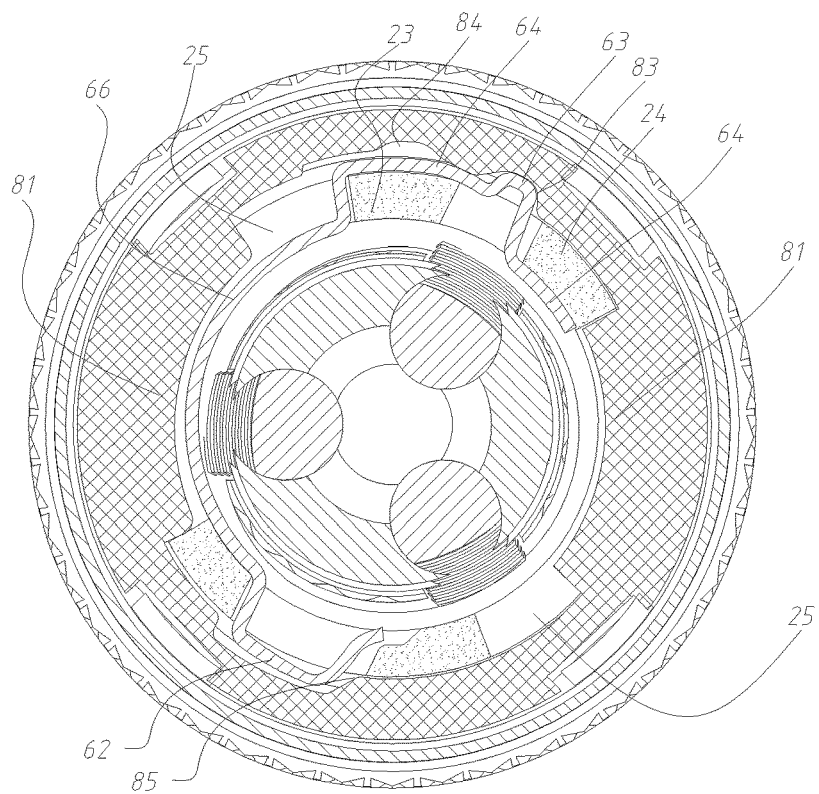
Figure 16:
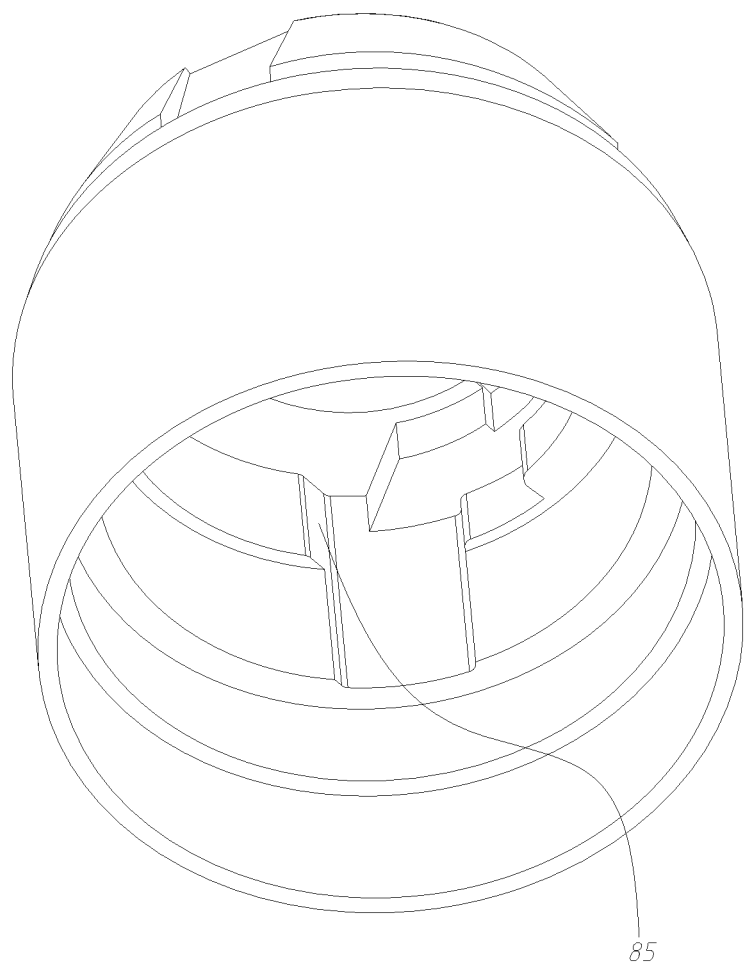
FIG. 16 is the internal structure diagram of the main sleeve body of the rotatable sleeve according to embodiment 3 of the present invention.

Embodiment 2, refers to FIGS. 8-10.

In this embodiment, a fifth key 26 is also arranged between the second key 22 and the third key 23 at the front end of the nut. The fifth key 26 is arranged close to the third key 23, and the distance between the fifth key 26 and the third key 23 satisfies the spring piece 6 passing through. The portion 66 of the spring piece 6 which is arranged between the side where the third key 23 is far away from the fourth key 24 to the side where the second key 22 is close to the first key 21 is located in the circular path of the gap between the keys and the drill body, namely, which is the inner side of the fifth key 26, the inner side of the following turning groove 25 and the inner side of the key 81 of the rotatable sleeve, and is also close to the inner side of the fifth key 26.

The space between the second key 22 and the fifth key 26 forms an turning groove 25, and the space between the second key 22 and the third key 23 corresponding to the rotatable sleeve 8 is provided with a key 81; the remaining circumferential length of the space between the second key 22 and the fifth key 25 after removing the key 81 of the rotatable sleeve corresponds to the rotation angle of the rotatable sleeve when the un-self-locking state and the self-locking state are switched.

Other portions of the embodiment shown in FIGS. 8-10 are the same as those shown in FIGS. 1-7 and adopt the same reference number.

Embodiment 3, refers to FIGS. 1, 2, and 11-16.

The structure of the embodiment helps to reduce the diameter of the front portion of the self-locking drill chuck, helps the front portion of the self-locking drill chuck to achieve a streamlined shape similar to a bullet and to achieve the miniaturization of the self-locking drill chuck; on the basis of reducing the material diameter of the drill body, it fully guarantees the internal space of the drill chuck, satisfies the configuration, installation and positioning of each functional component, and improves the retention capacity in the self-locking state to prevent the self-locking state from existing due to inertia under high-speed rotation situation.

Figure 2:
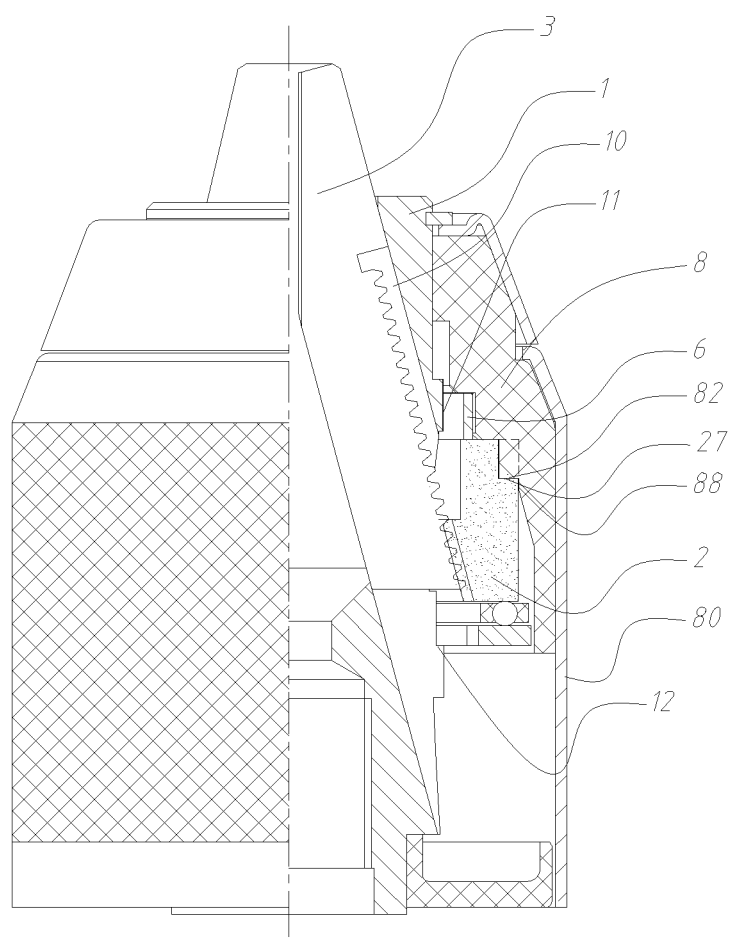
FIG. 2 is a sectional view of embodiment 1 of the present invention.
Figure 3:
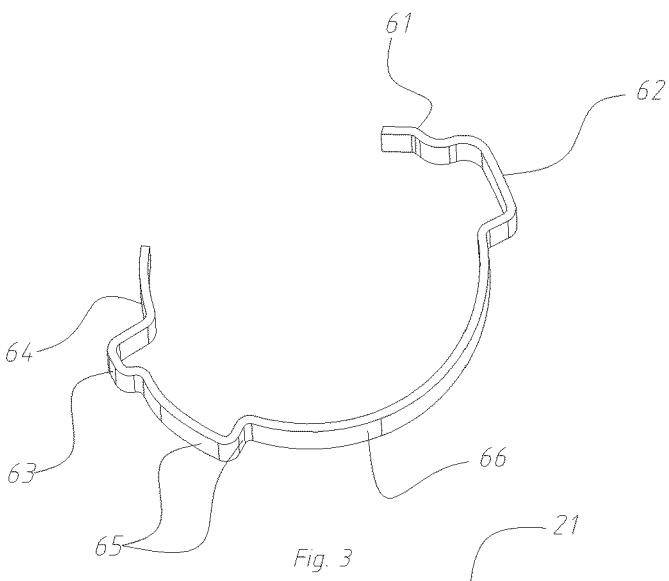
FIG. 3 is a schematic diagram of the spring piece in embodiment 1 of the present invention.
Figure 4:
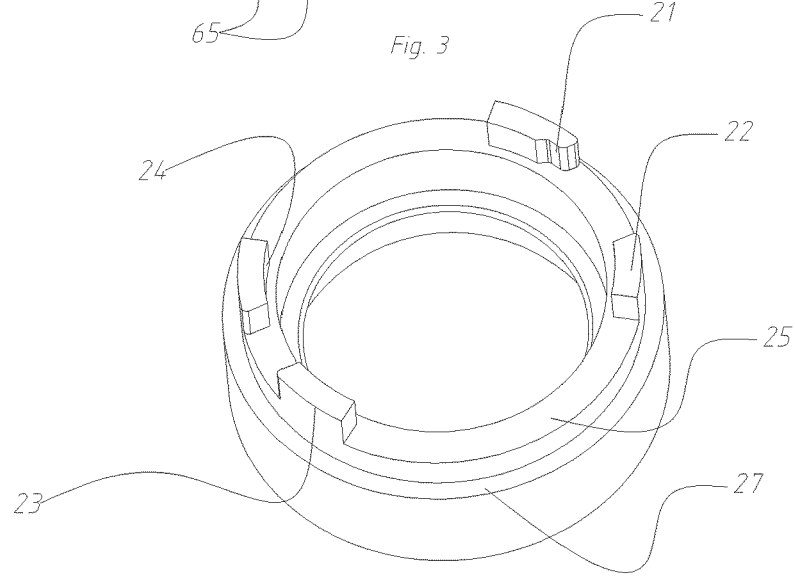
FIG. 4 is a schematic diagram of the nut in embodiment 1 of the present invention.
Figure 5:
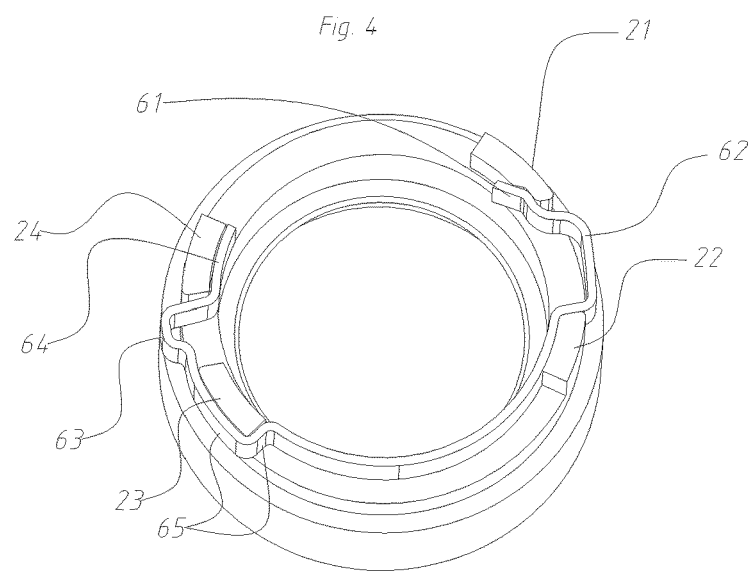
FIG. 5 is a schematic diagram of the assembly of the nut and the spring piece in embodiment 1 of the present invention.
Figure 6:
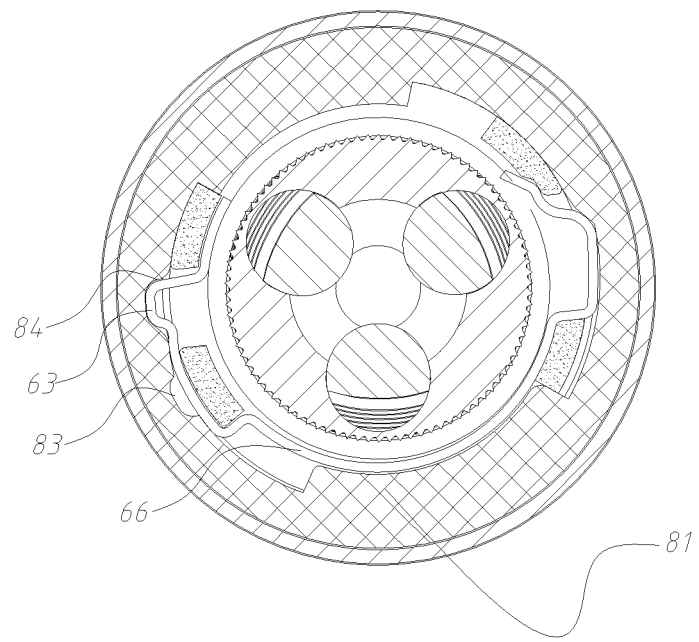
FIG. 6 is a sectional view of embodiment 1 of the present invention when it is in the un-self-locking state, showing the cooperating state of the keys on the spring piece, the teeth, the rotatable sleeve and the nut.
Figure 7:
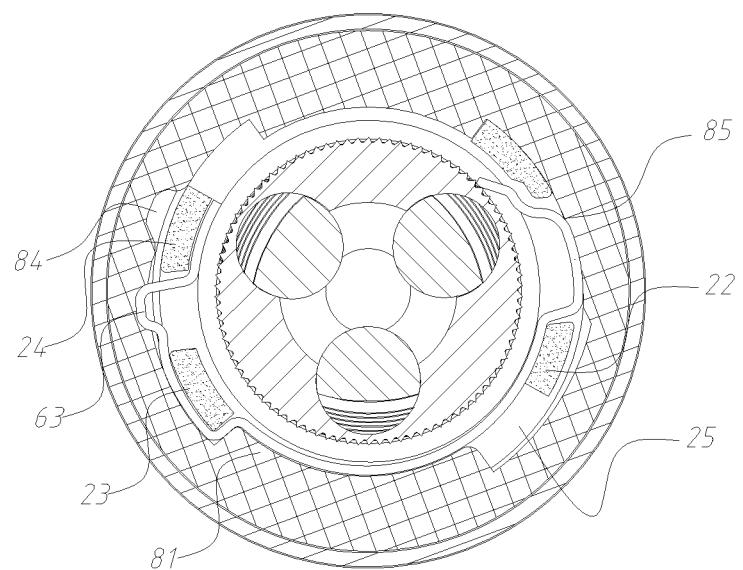
FIG. 7 is a sectional view of embodiment 1 of the present invention when it is in the self-locking state, showing the cooperating state of the key on the spring piece, the teeth, the rotatable sleeve and the nut.

First, refer to FIGS. 1 and 2. For the self-locking drill chuck provided by the present invention, the drill body is provided with inclined jaw slots 10 for the jaws 3 to slide back and forth along the clamping jaw slots 10, and the washer 4 is supported on the step 12 in the middle of the drill body 1. The drill body is not provided with a nut groove, and the nut is an integral nut. The rotatable sleeve 8 comprises a main sleeve body and a metal shell 80. In the figure, the reference number 8 refers to the main sleeve body. The front end of the rotatable sleeve is also provided with a decorative steel cap 87, and the rotatable sleeve 8 is limited at the front by cooperation of the circlip 13 connected to the drill body 1 and the decorative steel cap 87. The main sleeve body can be made of engineering plastics.

The shape of the front end of the main sleeve body is in the shape of a truncated cone, and the shape of the decorative steel cap 87 is also in the shape of a matched truncated cone.

In the axial direction, the main sleeve body of the rotatable sleeve 8 does not extend to the axial position corresponding to the rear end of the each jaw when the jaw 3 retreats back to the limit position. The rotatable sleeve 8 is radially positioned with the rear end of the drill body through the back cover 86 fixed at the rear end of the metal shell 80, which can meet the requirement of the movement space of the jaw 3 while reducing the overall diameter of the drill chuck.

The front end of the nut 2 is provided with a limit step 27, and the inner side of the main sleeve body is provided with a limit structure 82 cooperated with the limit step 27 of the nut 2 which is radially positioned and cooperated with the inner wall 88 of the main sleeve body. The radial positioning of the bearing 5 also does not pass through the drill body 1, and the bearing frame of the bearing 5 has a folded edge, which is cooperated with the inner wall of the main sleeve and/or the washer 4 to carry out the radial positioning.

The washer 4 is provided with jaw concession grooves 41 for the jaws, which are used to make way for the back and forth movement of the jaws 6 after the diameter of the drill body 1 is reduced; the inner periphery 42 of the washer between the two jaw concession grooves 41 cooperate with the drill body to form a radial positioning; a plurality of teeth are provided on the inner periphery of the washer between the two jaw concession grooves, and the tooth tips of the teeth are embedded into the surface of the drill body to facilitate the installation of the washer 4, and to achieve the function of arresting the circumferential rotation.

The inner periphery of the washer between the two jaw concession grooves can be embedded into the groove on the surface of the drill body to facilitate the installation.

The self-locking structure comprises a ring of teeth 11 and a spring piece 6, and the ring of the teeth 11 is arranged on the peripheral surface of the front portion of the drill body. According to the structure of the present embodiment, the position of the teeth 11 can be closer to the rear in the axial direction than the teeth in the previous self-locking structures. In the axial direction, the circumferential track of the ring of the teeth 11 can partially intersect the contour 101 of the jaw slots 10 on the drill body surface, that is, the axial length of the tooth 111 corresponding to the front end of the jaw slot is shorter than that of the tooth 112 beside the jaw slot.

The spring piece 6 has a lock end 61 and a lock end protrusion 62 cooperated with the teeth 11, and the main sleeve body has a cam structure 85 which is cooperated with the lock end protrusion 82 to control the lock end of the spring piece; the spring piece 6 rotates synchronously by connecting its main body 60 with the nut 3; in the axial direction of the drill chuck, the main body 60 of the spring piece moves backward to the rear of the tooth 11, and is not covered on the periphery of the tooth 11; the position close to the lock end of the main body 60 of the spring piece is provided with an axial protrusion 610, and on the basis of the spring piece body 60, the spring piece 6 can make the lock end 61 reach the position for cooperating with the teeth 11 through the axial protrusion 610.

The structure of the spring sheet 6 except for the radially protrusion portion is the same as that of embodiment 1. The spring piece of the present embodiment is drawn according to its axial height (axial dimension between the bottom of the main body 60 of the spring piece and the front end of the axial protrusion 610), and the axial protrusion 610 is formed at the end of the main body 60 of the spring piece.

The connection between the spring piece 6 and the nut 2 and the connection between the spring piece 6 and the rotatable sleeve 8 can be in the same way as that in embodiment 1; it can also be connected in accordance with other traditional connection ways of the self-locking drill chuck, which will not be repeated here. The relationship between the rotatable sleeve and the nut is also the same as in embodiment 1, and will not be repeated.

Figure 17:
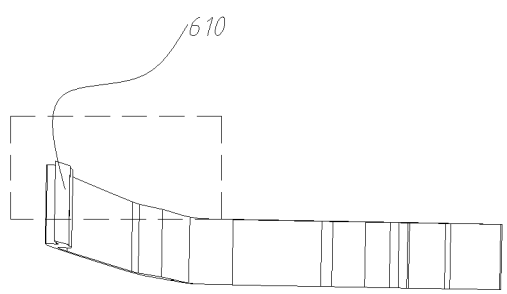
FIG. 17 is a front view of another embodiment of the spring price provided in embodiment 4 of the present invention.
Figure 18:
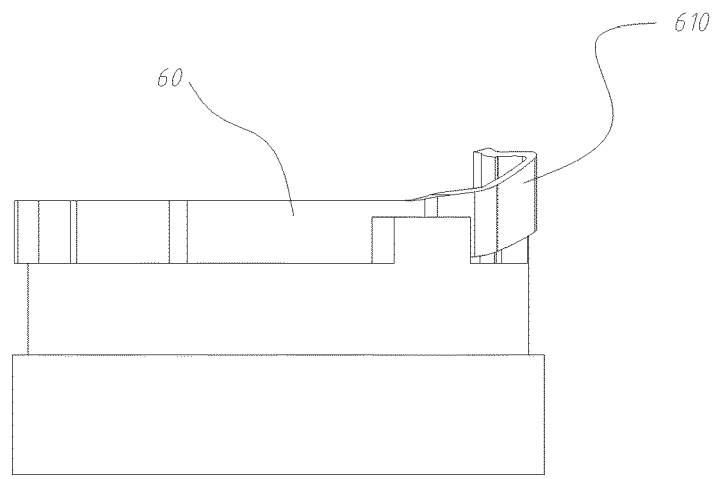
FIGS. 18 and 19 are the main view and stereogram of the shrapnel in embodiment 4 of the present invention when it is installed on the nut.
Figure 19:
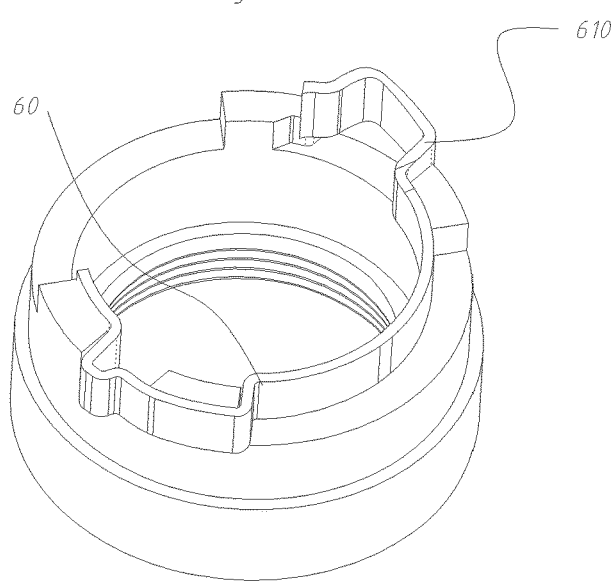

Embodiment 4, refers to FIGS. 17, 18 and 19.

In the present embodiment, the spring piece 6 is only taken according to the axial height of the main body 60 of the spring piece, and the ends are axially bent forward; the axial protrusion 610 is formed at the ends of the main body 60 of the spring piece. The other portions of this embodiment is the same as that of embodiment 3.

Figure 20:
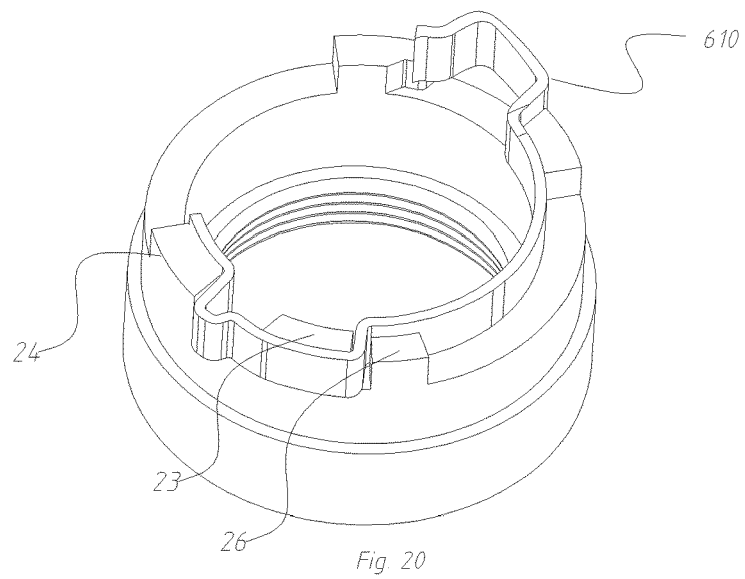
FIG. 20 is a stereogram of the spring price installed on the nut in embodiment 5 of the present invention.

Embodiment 5, refers to FIG. 20.

In this embodiment, the nut 2 adopts the nut of the second embodiment, and the gas portion of this embodiment is the same as that of embodiment 4.

The above is only a specific embodiment of the invention, but the structural features of the present invention are not limited to this. Any change or modification made by those skilled in the art in the field of the present invention is covered by the scope of protection of the present invention.

The invention claimed is:

1. A self-locking drill chuck comprises a rotatable sleeve, a drill body, a nut, jaws and a self-locking structure, and the self-locking structure comprises teeth and a spring piece; the teeth are on the drill body or on a component fixed on the drill body, and the spring piece and the nut rotate synchronously; the first end of the spring piece is used as the lock end cooperated with the teeth, and a connecting protrusion is provided near the second end; the rotatable sleeve has a first portion that is connected with the connecting protrusion of the spring piece in a self-locking state, and a second portion that is connected with the connecting protrusion of the spring piece in a un-self-locking state, and a cam structure for controlling the lock end of the spring piece, wherein:

The front end of the nut is provided with several keys, and the spring piece is limited between the keys of the nut by its elasticity so that it is assembled on the nut; the second end of the spring piece passes into a gap between the keys and the drill body through a pair of keys among the keys, and is attached to the key by its elasticity; the connecting protrusion is arranged on the spring piece portion between the pair of keys;

The lock end is located in a gap between the key corresponding to the lock end, and the drill body; and the front end of the nut is provided with a first key, a second key, a third key and a fourth key along the circumferential direction, wherein the second end of the spring piece passes into a gap between the keys and the drill body through the third key and the fourth key and is elastically attached to the fourth key by itself; the spring piece is provided with a lock end protrusion cooperated with the cam structure near the lock end, and the spring piece is arranged between the side where the third key is far away from the fourth key to the side where the second key is close to the first key, and is located in a gap between the keys and the drill body; the lock end protrusion protrudes from between the first key and the second key to the outside of the nut to cooperate with the cam structure.

2. The self-locking drill chuck according to claim 1, wherein the space between the second key and the third key forms a turning groove; the rotatable sleeve corresponds to the space between the second key and the third key is provided with a key; the portion of the spring piece corresponding to the space between the second key and the third key is bent to the inside of the turning groove and the inside of the key of the rotatable sleeve, and the remaining circumferential length of the space between the second key and the third key after removing the key of the rotatable sleeve corresponds to the rotation angle of the rotatable sleeve when the un-self-locking state and the self-locking state are switched.

3. The self-locking drill chuck according to claim 2, wherein the rotatable sleeve comprises a main sleeve body and a metal shell, and the main sleeve body is provided with the cam structure, the structure connected with the spring piece and the keys cooperated with the turning groove.

4. The self-locking drill chuck according to claim 1, wherein the spring piece is provided with a protrusion that surrounds the third key on at least two sides from the outside.

5. The self-locking drill chuck according to claim 1, wherein the nut is an integral nut, which the front end of the drill chuck is provided with a limit structure for the nut, and the drill body is not provided with an axial limit groove for the nut.

6. The self-locking drill chuck according to claim 5, wherein the rotatable sleeve comprises a main sleeve body and a metal shell; the axial positioning of the front part of the integral nut is formed by the cooperation of the integral nut and the main sleeve body, and the nut is cooperated with one or two of the main sleeve body and the drill body to achieve radial positioning;

the drill chuck is provided with a washer which is supported on a step provided in the middle of the drill body, and the nut is placed on the washer through a bearing; the radial positioning of the bearing is not through the drill body, but is cooperated with one or two of the washer, the main sleeve body and the nut.

7. The self-locking drill chuck according to claim 6, wherein the washer is provided with concession grooves for the jaws; the inner periphery of the washer between two jaw concession grooves of the concession grooves forms a radial positioning cooperation with the drill body; a plurality of the teeth are arranged around the inner periphery of the washer between the jaw concession grooves, and tooth tips of the teeth on the inner periphery of the washer are embedded into the surface of the drill body;

the inner periphery of the washer between the jaw concession grooves is embedded into a groove on the surface of the drill body;

the drill body is provided with a positioning step at the front of the support step, and the circumference of the positioning step is radially positioned with the washer; the positioning step protrudes from the drill body in front of the drill body, and the tooth tips of the teeth on the inner periphery of the washer are embedded into the surface of the drill body.

8. The self-locking drill chuck according to claim 5, wherein the front end of the nut is provided with a limit step, and the inside of the rotatable sleeve is provided with the limit structure cooperated with the limit step of the nut; after the combined component of the nut and the spring piece is mounted on the outside of the front end of the drill body, the rotatable sleeve is installed, which the installation and limit of the nut are completed.

9. The self-locking drill chuck according to claim 1, wherein a fifth key is arranged between the second key and the third key, at the front end of the nut, and the fifth key is arranged close to the third key with the space between the fifth key and the third key satisfying the spring piece to pass through.

10. The self-locking drill chuck according to claim 9, wherein the space between the second key and the fifth key forms a turning groove, and the rotatable sleeve corresponds to the space between the second key and the fifth key is provided with a key; the remaining circumferential length of the space between the second key and the fifth key after removing the key of the rotatable sleeve corresponds to the rotation angle of the rotatable sleeve when the un-self-locking state and the self-locking state are switched.

11. The self-locking drill chuck according to claim 1, wherein a ring of the teeth is arranged on the drill body, and the outer diameter of the ring of the teeth is not greater than the bore of the nut; in the axial direction of the drill chuck, the main body of the spring piece moves backward to the rear of the teeth and does not cover the periphery of the teeth; the spring piece is provided with an axial protrusion at the portion where the main body of the spring piece is close to the lock end, and on the basis of the main body of the spring piece, the lock end of the spring piece can reach the position that cooperates with the teeth through the axial protrusion.

12. The self-locking drill chuck according to claim 11, wherein in the axial direction, a circular track of the teeth partially intersects with a contour of jaw slots on the surface of the drill body.

13. The self-locking drill chuck according to claim 1, wherein the rotatable sleeve comprises a main sleeve body and a metal shell, and the main sleeve body is provided with the cam structure and the structure connected with the spring piece.

14. The self-locking drill chuck according to claim 13, wherein in the axial direction, the main sleeve body of the rotatable sleeve does not extend to the axial position corresponding to the rear end of the each jaw when the jaw retreats to a limit position, and the metal shell of the rotatable sleeve is radially positioned with the rear end of the drill body through a back cover fixed at the rear of the rotatable sleeve.

* * * * *